(12) United States Patent
Svendsen et al.

(10) Patent No.: US 6,954,543 B2
(45) Date of Patent: Oct. 11, 2005

(54) AUTOMATED DISCOVERY, ASSIGNMENT, AND SUBMISSION OF IMAGE METADATA TO A NETWORK-BASED PHOTOSHARING SERVICE

(75) Inventors: Hugh Svendsen, Apex, NC (US); Patricia Scardino, Apex, NC (US)

(73) Assignee: IPAC Acquisition Subsidiary I, LLC, Portsmouth, NH (US)

( * ) Notice: Subject to any disclaimer, the term of this patent is extended or adjusted under 35 U.S.C. 154(b) by 483 days.

(21) Appl. No.: 10/087,262

(22) Filed: Feb. 28, 2002

(65) Prior Publication Data

US 2003/0161499 A1 Aug. 28, 2003

(51) Int. Cl.7 .............................. G06K 9/00; G06F 7/00; G06F 17/00; G06F 17/30
(52) U.S. Cl. ........................ 382/102; 707/1; 707/104.1
(58) Field of Search .............................. 707/10, 3, 102; 382/102

(56) References Cited

U.S. PATENT DOCUMENTS

| | | | |
|---|---|---|---|
| 6,035,323 A | | 3/2000 | Narayen et al. |
| 6,501,911 B1 | | 12/2002 | Malloy Desormeaux |
| 6,505,003 B1 | | 1/2003 | Malloy Desormeaux |
| 6,516,154 B1 | | 2/2003 | Parulski et al. |
| 6,757,684 B2 | * | 6/2004 | Svendsen et al. ............ 707/10 |
| 6,760,884 B1 | * | 7/2004 | Vertelney et al. ........ 715/500.1 |
| 2002/0065741 A1 | * | 5/2002 | Baum ......................... 705/26 |
| 2002/0087601 A1 | * | 7/2002 | Anderson et al. ........... 707/515 |
| 2002/0093678 A1 | * | 7/2002 | Skidgel et al. ............. 358/1.15 |
| 2002/0135801 A1 | * | 9/2002 | Tessman et al. ........... 358/1.15 |
| 2003/0078968 A1 | * | 4/2003 | Needham et al. ........... 709/204 |
| 2003/0105795 A1 | * | 6/2003 | Anderson et al. ........... 709/101 |
| 2003/0131002 A1 | * | 7/2003 | Gennetten et al. ............ 707/10 |
| 2003/0154178 A1 | * | 8/2003 | McIntyre et al. .............. 707/1 |

* cited by examiner

*Primary Examiner*—Frantz Coby
*Assistant Examiner*—Cindy Nguyen
(74) *Attorney, Agent, or Firm*—Sawyer Law Group LLP (57) ABSTRACT

An automated metadata discovery, assignment, and submission system is disclosed. The system includes a photosharing service coupled to a network through a server, where the server stores metadata fields. The system also includes at least one client computer capable of communicating with the server over the network, where the client computer stores a plurality digital files and an automation application. When executed, the automation application establishes communication with the photosharing service and downloads the metadata fields. The content of a first file is then automatically analyzed and one or metadata values are assigned to the downloaded metadata fields based on the analysis. In addition, the automation application automatically discovers any pre-existing metadata values associated with the file and uses the metadata values to populate corresponding downloaded metadata fields. Both the pre-existing and automatically assigned metadata values are then displayed to the user for viewing and editing. The metadata values assigned to the file are recoded for use with a next image, and the file and the metadata values are uploaded to the photosharing service for storage.

29 Claims, 6 Drawing Sheets

AUTOMATED DISCOVERY, ASSIGNMENT, AND SUBMISSION OF IMAGE METADATA TO A NETWORK-BASED PHOTOSHARING SERVICE

FIELD OF THE INVENTION

The present invention relates to digital image metadata and online photosharing services, and more particularly to a method and system for automatically discovering and assigning metadata to digital images, and for submitting the metadata to the photosharing service.

BACKGROUND OF THE INVENTION

Over the past several years, photosharing has become widely accepted by photo enthusiasts. Many photosharing websites currently exist that allow users to upload digital images to the site for storage on a server and for viewing by others over the Internet. There are generally three methods for delivering images to the photosharing site: 1) using file upload capabilities of a web browser, 2) delivering images via e-mail submission, and 3) installing a separate upload application on the user's computer to upload the images. Examples of photosharing sites that offer a separate upload application include Ofoto.com and Shutterfly.com.

As digital photography becomes more prevalent, the number of digital images that are stored on photosharing sites will increase dramatically, and the number of images will make it increasingly difficult for a user to find desired images. Metadata offers a solution to this problem by providing a means by which users can categorize their images for later search and retrieval. Metadata is typically supported by most online photosharing sites in that once images are uploaded to the site, the user may view the metadata associated with an image.

There are PC-based image applications in existence that allow a user to enter metadata to categorize the images stored on the PC. However, only the upload application submission method allows the user to view, modify, or add any metadata associated with the images prior to the submission process, assuming of course that the upload application is programmed with these capabilities.

If the upload application is not programmed with such capabilities, then at least two different applications are required the upload application, and a PC-based image application. Obviously not every user of the upload application will have, or will use, a PC-based image application to enter metadata prior to uploading the images.

In addition, whether or not the user uses a PC-based image application or an image upload application to enter metadata, requiring the user to manual input all the metadata has a further drawback. The drawback is that in order to categorize a group of images, the user must retype the metadata values for each image. When categorizing the contents of a digital camera, manually entering metadata for each image is extremely tedious and time-consuming for the user. The problem is even worse for users who have a large collection of photo CDs or scanned images that they wish to electronically archive on the photosharing site.

In addition to requiring the user to manually input metadata, conventional upload applications have the further disadvantages. For example, upload applications do not have the ability to edit images, add additional file type support, or the ability to support well-known image recognition applications. Upload applications further fail to distinguish different types of metadata to the user. For example, one type of metadata is metadata that is automatically attached to the image by a digital camera at the time of capture that identifies attributes about the image, such as exposure setting, image resolution, file size, and so on. Another type of metadata may be user categorization information entered into the PC-based image application by the user. Most conventional application that are capable of displaying metadata display all metadata together as one group.

Accordingly, what is needed is a method and system for automatically discovering and assigning metadata to digital images, and for submitting the metadata to the photosharing service using a single application. The present invention addresses such a need.

SUMMARY OF THE INVENTION

The present invention provides a method for providing an automated metadata discovery, assignment, and submission system. The system includes a photosharing service coupled to a network through a server, where the server stores metadata fields. The system also includes at least one client computer capable of communicating with the server over the network, where the client computer stores a plurality digital files and an automation application. When executed, the automation application establishes communication with the photosharing service, and downloads the metadata fields. The content of a first file is then automatically analyzed and one or metadata values are assigned to the downloaded metadata fields based on the analysis. In addition, the automation application automatically discovers any pre-existing metadata values associated with the file and uses the metadata values to populate corresponding downloaded metadata fields. Both the pre-existing and automatically assigned metadata values are then displayed to the user for viewing and editing. The metadata values assigned to the file are recoded for use with a next image, and the file and the metadata values are uploaded to the photosharing service for storage.

According to the system and method disclosed herein, the present invention automatically discovers and assigns metadata to an image and predicts metadata values for user entry fields, thereby alleviating the user from tedious data entry. In addition, the application allows the user to edit the image and uploads the image and metadata, all using one application.

DETAILED DESCRIPTION

The present invention relates to image metadata and methods for populating the metadata and submitting the metadata across a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides an automation application, which when run on a user's computer, automatically discovers any existing metadata in image files, automatically analyzes the images and assigns new metadata based on the content of the images, allows the user to edit the images and to edit or add metadata to the images, and finally submits the images and metadata to a photosharing website.

Figure 1:
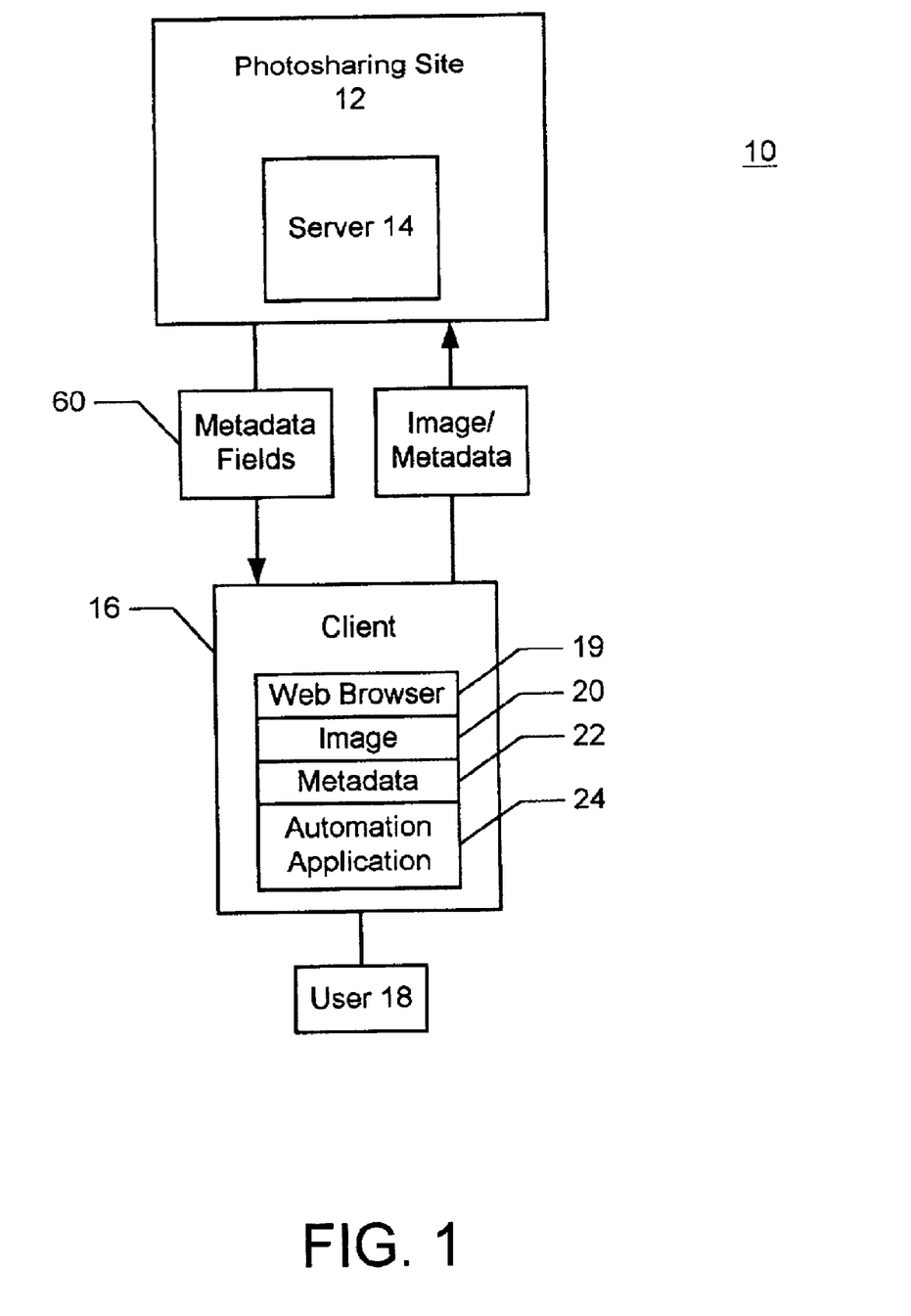
FIG. 1 is a block diagram illustrating an automated metadata discovery, assignment, and submission system in accordance with a preferred embodiment of the present invention.

FIG. 1 is a block diagram illustrating an automated metadata discovery, assignment, and submission system in accordance with a preferred embodiment of the present invention. According to the present invention, the system 10 includes a photosharing site website 12 that includes a server 14, and multiple client computers 16. In a preferred embodiment, the server 14 can be accessed at a specific uniform resource locator (URL) address on the Internet or other network.

The client computer 16 typically stores the digital images 20 of a particular user 18 as image files that include both image data and metadata 22 describing the image. In a preferred embodiment, the user 18 may register with the photosharing site 12 and download the automation application 24 using a standard web browser 19. Once installed, the automation application 24 may be used to submit the images 20 and metadata 22 to the photosharing site system 10. Although the metadata 22 is described as being part of the image file, those with ordinary skill in the art will recognize that the metadata 22 may also be stored externally from the image file.

According to the present invention, the automation application 24 also automatically analyzes the content of the images 20 and assigns new metadata 22 to the image 20 based on the analysis. Automatically assigning metadata 22 to the image alleviates the need for users to manually enter metadata. The automation application 24 also automatically discovers any pre-existing metadata 22 associated with the images 20 displays both the pre-existing and automatically assigned metadata 22 to the user 18 for viewing and editing. In addition, the automation application 24 allows the user 18 to make any last minute edits to the image itself. When the user 18 is satisfied, the automation application 24 submits the images 20 and the metadata 22 to the photosharing service 12. Although the present invention will be described in terms of a preferred embodiment where the targets to which the metadata 22 is applied are digital images 20, the metadata 22 may be applied to any type of digital file or resource.

Figure 2:
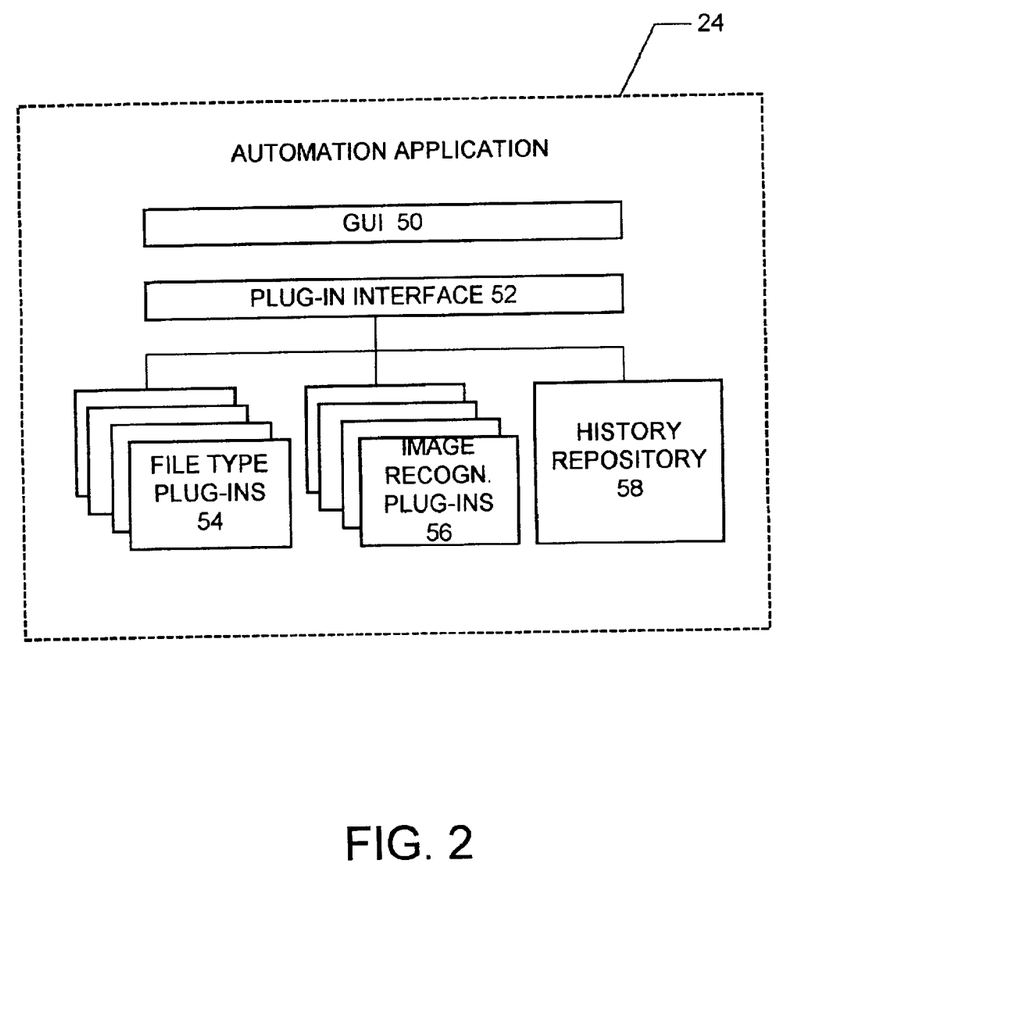
FIG. 2 is a block diagram illustrating components of the automation application in a preferred embodiment of the present invention.

FIG. 2 is a block diagram illustrating components of the automation application 24 in a preferred embodiment of the present invention. The automation application 24 includes a graphical user interface (GUI) 50, a plug-in interface 52, file type plug-ins 54, image recognition plug-ins 56, and a history repository 58.

The GUI 50 displays metadata information to the user 18 and displays forms by which the user 18 may enter and edit metadata 22. In a preferred embodiment, the GUI 50 displays the metadata 22 in a manner that visually distinguishes various types or categories of metadata 22 for the user 18, explained further below. The GUI 50 also displays supported image types and enables the user 18 to perform simple editing functions on the images 20, such as rotating and cropping, for instance.

The plug-in interface 52 of the automation application 24 allows the capabilities of automation application 24 to be expanded. For example, although the automation application 24 provides built-in support for well-known image file formats (e.g., jpeg, gif, tiff, etc.), file type plug-ins 54 may be added that interact with the automation application 24 through the plug-in interface 52 to enable the automation application 24 to support new file formats as they become available.

According to a further aspect of the present invention, the plug-in interface 52 also allows image-recognition plug-ins 56 to be used with the automation application 24. The image recognition plug-ins 56 are separate application programs that are capable of parsing and analyzing an image file and assigning metadata 22 to the file based on the analysis. Image recognition programs are well known in the art and further explanation is outside the scope of this description.

The history repository 58 records the metadata 22 assigned to the images 20, also explained further below. The GUI 50, the plug-in interface 52, the file type plug-ins 54, the image recognition plug-ins 56, and the history repository 58 all interact to allow the automation application 24 to perform a unique combination of functions under one application, as described in FIGS. 3A and 3B.

Figure 3A:
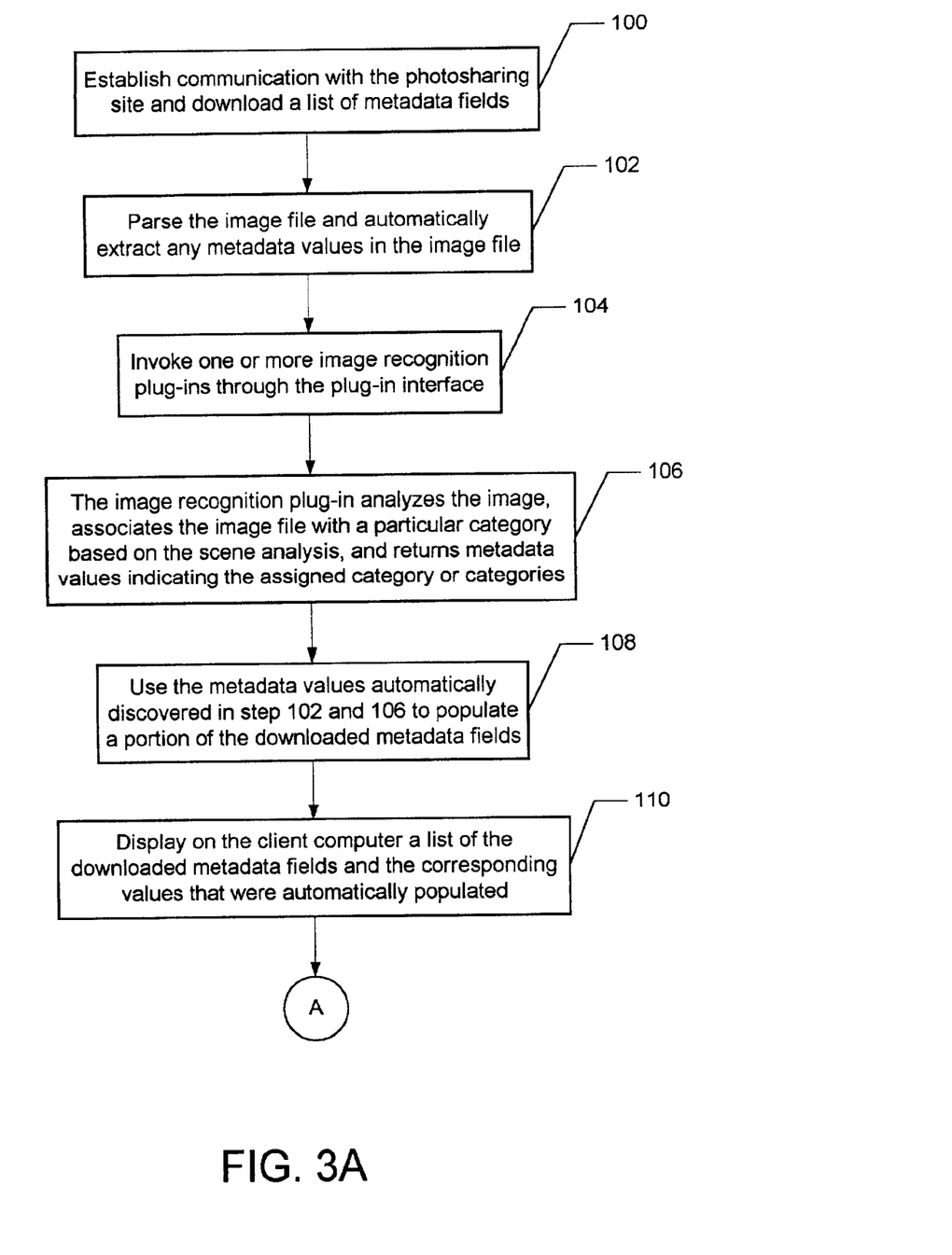
FIGS. 3A and 3B are a flow charts illustrating a process for automatically discovering and assigning metadata to digital images, and for submitting the metadata to the photosharing service in a preferred embodiment of the present invention.
Figure 3B:
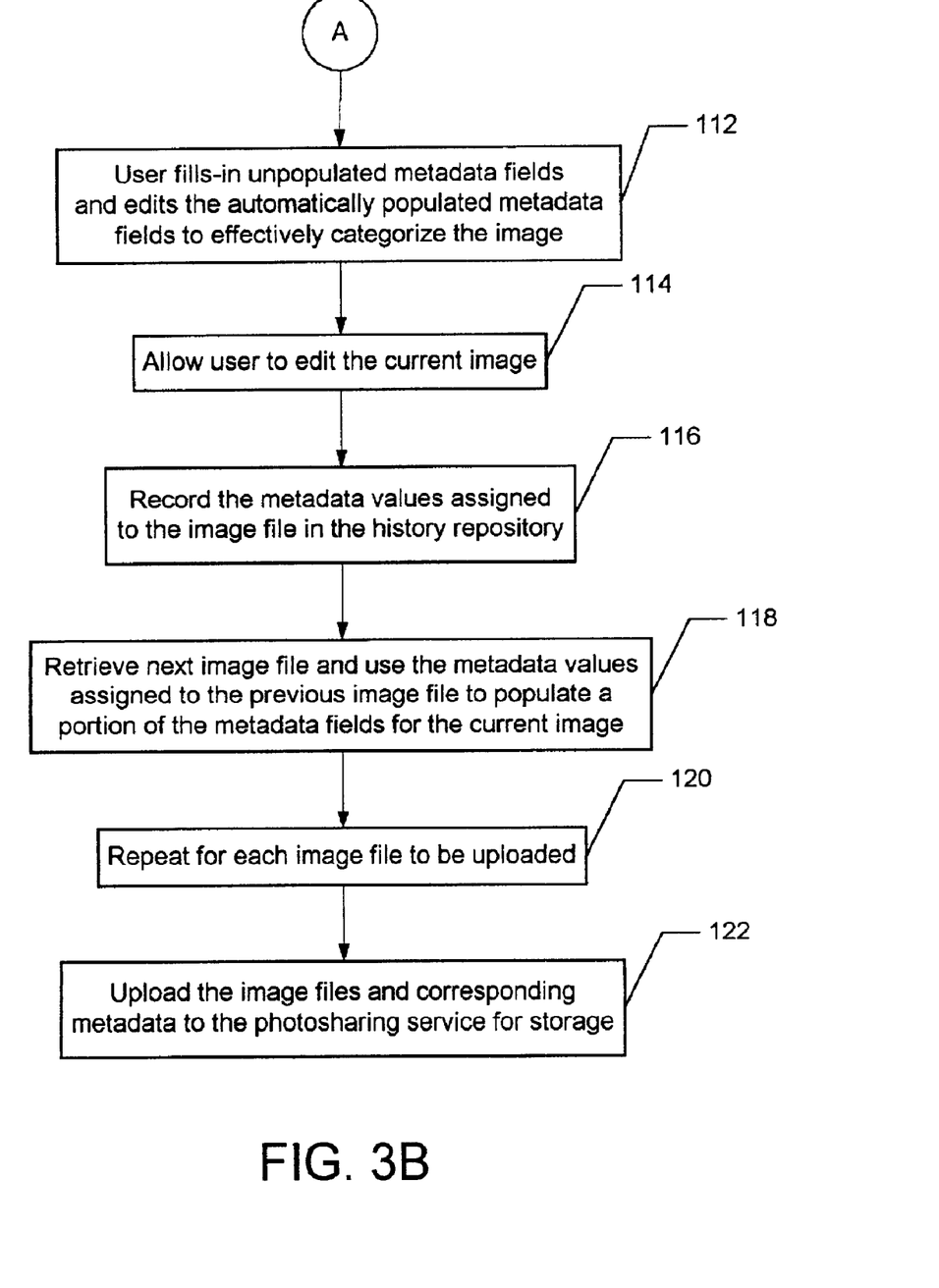

FIGS. 3A and 3B are flow charts illustrating a process for automatically discovering and assigning metadata to digital images, and for submitting the metadata to the photosharing service in a preferred embodiment of the present invention.

Referring to FIGS. 1–3, once the automation application 24 is invoked on the client computer 16, the automation application 24 establishes communication with the photosharing site 12 and downloads a list of metadata fields 60 that the automation application 24 is to gather from the images 20 on the client in step 100. The downloaded metadata fields 60 fall into two categories. The first category is metadata 22 which is auto detected from the file, such as metadata 22 stored with the image at capture time by a digital camera and metadata 22 automatically associated with the images by the automation application 24. The second category is metadata 22 that is to be manually entered by the user. This type of metadata 22 provides a further mechanism for the user to categorize their pictures. The downloaded metadata fields 60 may be further classified as optional fields and required fields.

After the metadata fields 60 are downloaded and the user 18 selects one or more images 20 to upload to the photosharing site 12, the automation application 24 parses the image file 20 and automatically extracts any metadata values in the image file 20 in step 102. The automation application 24 also uses the plug-in interface 52 to invoke one or more image recognition plug-ins 56 in step 104. The image recognition plug-in 56 (which are optional), analyzes the image, associates the image file 20 with a particular category based on the scene analysis, and returns metadata values indicating the assigned category or categories in step 106. In step 108, the automation application 24 uses the metadata values automatically discovered in step 102 and 106 to populate a portion of the downloaded metadata fields 60. In an alternative embodiment, the downloaded metadata fields 60 may be populated with the metadata values as soon as they are retrieved in each respective step.

Next, the automation application 24 displays on the client computer 16 a list of the downloaded metadata fields 60 and the corresponding values that were automatically populated in step 110. According to a further aspect of the p resent invention, the different categories of metadata may be displayed differently as a visual aid to the user. In a preferred embodiment, the metadata values automatically extracted from the image file 20 may be displayed in green. The metadata values were automatically assigned by the automation application 24 may be displayed in yellow. Required metadata fields 60 that the user must enter values for may be indicated in red.

The user 18 may then fill-in unpopulated metadata fields 60 and edit the automatically populated metadata fields 60 to effectively categorize the image in step 112. After filling-in metadata fields 60, the user 18 is allowed to edit the current image in step 114. These edits would include items like rotation, color correction, and cropping. This step can be presented to the user 18 at any time before sending the information to the photosharing site 12 (It does not have to be performed after the metadata-editing steps).

After the user 18 is finished editing the metadata and/or the image, the history repository 58 is used to record the metadata values assigned to image file 20 in step 116. The next selected image file 20 is then retrieved and the metadata values assigned to the previous image file are used to populate a portion of the metadata fields for the current image in step 118 in an effort to predict future values and alleviate potentially tedious data entry by the user. In the preferred embodiment, the history repository 58 is implemented via the plug-in interface 52. The default history plug-in 58 simply uses the previous values as the predicted values for the next image 20. Naturally, for the first image to be uploaded, the user 18 is prompted to enter these the fields since they will be blank.

The above steps are repeated for each image file 20 to be uploaded to the photosharing site 12 in step 120, and the automation application 24 uploads the image files 20 and corresponding metadata 22 to the photosharing service 12 for storage in step 122. In a preferred embodiment, the images 20 and metadata 22 are placed in a queue that is processed by the automation application 24 in the background.

Figure 4:
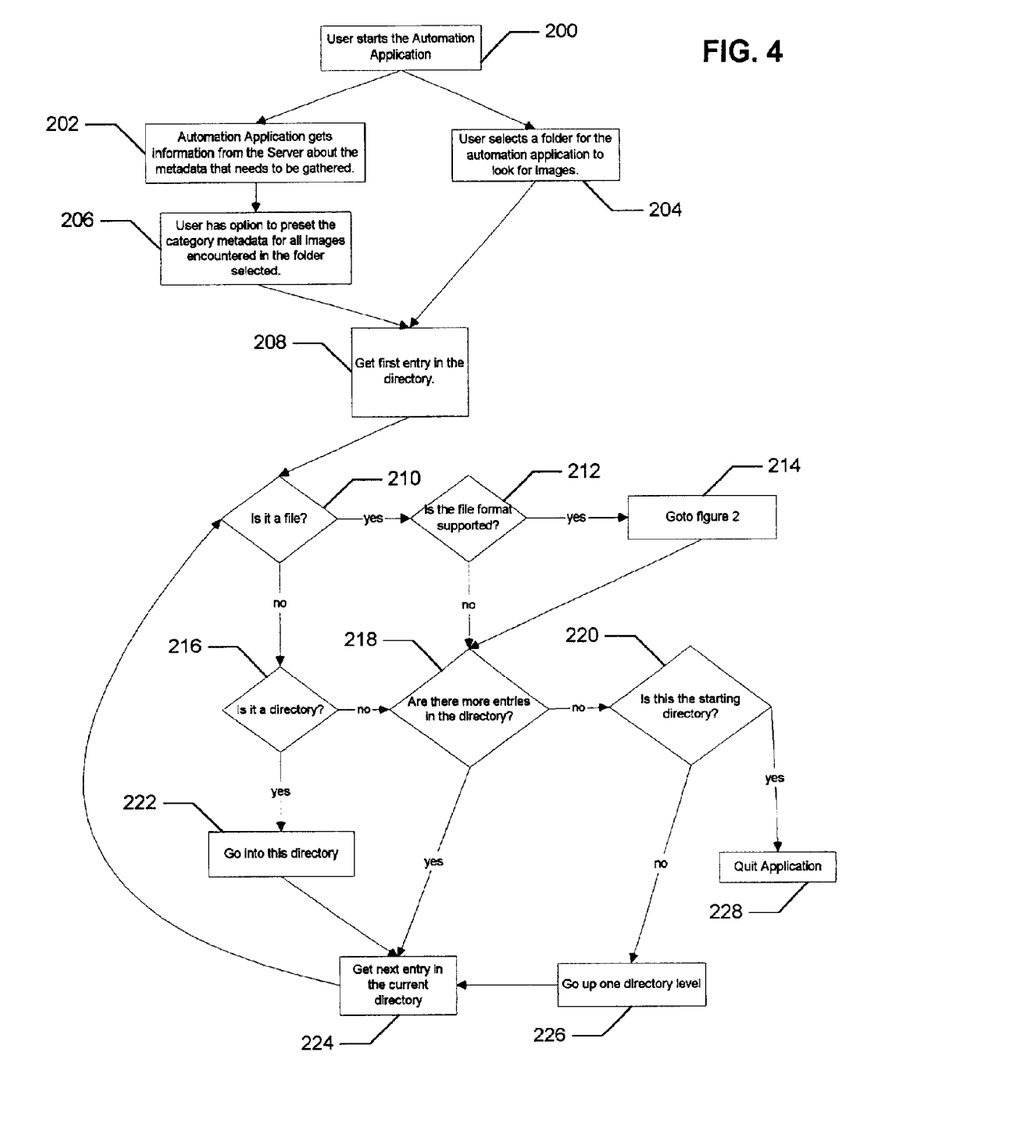
FIG. 4 is a flow chart illustrating the automation application process in further detail.

FIG. 4 is a flow chart illustrating the automation application process in further detail. It should be understood that these steps are not necessary to practice the present invention, but are given as an example of the preferred embodiment. In step 200, the user 18 starts the automation application 24. In step 202, the application 24 downloads metadata field 60 information from the photosharing site 12, while at the same time requesting the user 18 to select a folder or directory in which the images 20 to be uploaded are stored in step 204. In an alternate embodiment, the user may also set a default folder from which the application 24 automatically retrieves the images 20.

Step 206 optionally gives the user the ability to preset the metadata field values to speed up the process of assigning and uploading and metadata 22 and the images 20. There may be some category metadata fields 60 whose value remains the same for all images encountered. In an alternate embodiment this step could also be placed after the user selects a directory in step 222, thus enabling the user to change the preset values when a new directory is encountered.

Figure 5:
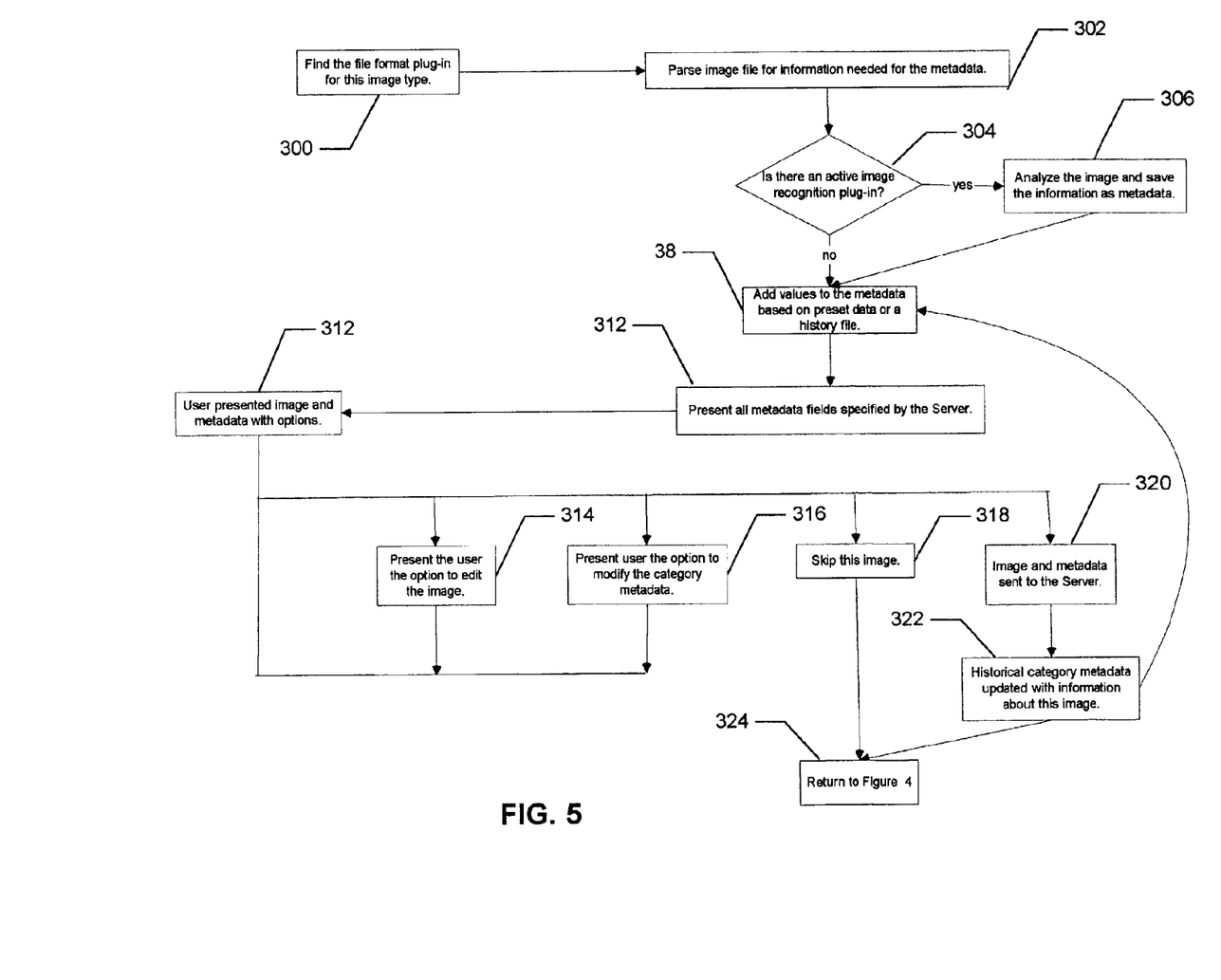
FIG. 5 is a flow chart illustrating the metadata processing for each image in a preferred embodiment.

The automation application 24 then retrieves the first entry from the specified directory in step 208. Steps 208, 210, 212, 214, 216, 218, 220, and 222 show a basic path for processing all image files 20 found in a directory and all subdirectories. It is first determined if the entry is a file in step 210 or a directory in step 216. If the entry is a file, then it is determined if the file format is one that is supported by the automation application 24 or the plug-in file types 54 in step 212. When an image is found that has a supported file format, the process continues as shown in FIG. 5. If the file format is not supported, then it is determined if there are other entries in the current directory to process in step 218.

If the entry is not a file but a directory in step 216, then the directory in step 216 is entered in step 222, and the next entry in the directory is retrieved in step 224. If it is determined that the entry is not a directory in step 216, then it is determined if there are more entries in the current directory in step 218. If there are more entries in the current directory, then the next entry in the directory is retrieved in step 224 and the process continues with step 210. If there are no more entries in the current directory, then it is determined if the current directory is the starting directory in step 220. If the current directory is the starting directory, then the automation application 24 notifies the user 18 and the current process terminates in step 228. If the current directory is not the starting directory, the automation application 24 goes up one directory level in step 226.

FIG. 5 is a flow chart illustrating the metadata processing for each image in a preferred embodiment. The process begins by finding and invoking the file type plug-in 54 that handles the type of image found in step 300. The file-type plug-in then parses the image file 20 in step 302 for any metadata present in the file 20, such as the date/time of capture, whether a flash was used, exposure value used, focus distance, and other capture parameters. The automation application 24 then determines if there are any active image recognition plug-ins 56 present in step 304. If so, then the automation application 24 invokes one or more of the image recognition plug-ins 56 in step 306 to analyze the image and to assign metadata values. The automation application 24 then adds the metadata values returned from the image recognition plug-ins 56 to the preset values the user specified in step 202 and to any predicted values found in the history repository in step 322.

The automation application 24 then uses this set of metadata values output from steps 302, 306 and 308 to automatically populate corresponding downloaded metadata fields 60 displays the metadata fields and values found to the user 18. As described above, in the preferred embodiment, the values are displayed visually different to indicate where the values originated. Using different colors is only one example of how to show these differences, as there are many other ways to make the origination of different types of metadata values stand out for the user 18.

The image 20 may also be displayed with the metadata 22 to the user 18 in step 312. At this point, the user 18 is given the option of choosing which step is next. Step 314 allows the user 18 to edit the image data (options include rotation, color correction, cropping, and other standard image editing functions). Step 316 allows the user 18 to modify the metadata values that were automatically provided. Step 318 allows the user 18 to skip the upload of the present image 20. And step 320 allows the user 18 to upload the image 20 and the metadata 22 to the photosharing service 12. After the image 20 is uploaded, the category metadata 22 for the image 20 is saved in the history repository 58 for use with the next image 20 selected. In step 324, the process returns to FIGS. 3A and 3B to retrieve the next image 20, and the process continues until metadata 22 is automatically discovered and uploaded for each of the user's images 20.

A method and system for automatically discovering and assigning metadata to digital images, and for submitting the metadata to the photosharing service has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. An automated metadata discovery, assignment, and submission system, comprising:
   a photosharing service coupled to a network through a server, the server storing metadata fields; and
   at least one client computer capable of communicating with the server over the network, the client computer storing a plurality digital files and an automation application, wherein, when executed the automation application is functional for;
   establishing communication with the photosharing service,
   downloading the metadata fields,
   automatically analyzing the content of a first file and assigning one or metadata values to the downloaded metadata fields based on the analysis,
   automatically discovering any pre-existing metadata values associated with the file and using the metadata values to populate corresponding downloaded metadata fields,
   displaying both the pre-existing and automatically assigned metadata values to the user for viewing and editing,
   recording the metadata values assigned to the file for use with a next image, and
   uploading the file and the metadata values to the photosharing service for storage.

2. The system of claim 1 wherein the digital file comprises a digital image.

3. The system of claim 1 wherein the automation application allows the user to perform edits on the image prior to uploading.

4. The system of claim 1 wherein the automation application includes a graphical user interface (GUI) for displaying the metadata values to the user and for displaying forms by which the user may enter and edit metadata values.

5. The system of claim 4 wherein the GUI displays the metadata values in a manner that visually distinguishes various categories of metadata for the user.

6. The system of claim 1 wherein the automation application includes a plug- in interface.

7. The system of claim 6 wherein the automation application provides built-in support for a plurality of image file formats, and wherein file type plug-ins may be added for interacting with the automation application through the plug-in interface to enable the automation application to support new file formats.

8. The system of claim 7 wherein the automation application uses image recognition plug-ins to analyze the image.

9. The system of claim 1 wherein the automation application further includes a history repository for recording the metadata values assigned to the image.

10. A method for automatically discovering metadata for digital image files and for submitting the metadata and image files to a network-based photosharing service by an application running on a client computer, the method comprising steps of:

(a) downloading to the client computer from the photosharing service a list of metadata fields to be populated for the image files;
    (b) selecting a first image file and parsing the image file to extract metadata values therein, and using the metadata values to populate a portion of the downloaded metadata fields;
    (c) providing the application with a plug-in interface by which multiple image recognition applications may be added to the application, and using at least one of the image recognition applications to automatically analyze the image file, associate the image file with a particular category based on the analysis, and to populate at least one of the downloaded metadata fields with a value indicating the assigned category;
    (d) displaying on the client computer a list of the downloaded metadata fields and the corresponding values that were automatically populated in steps (b) and (c);
    (e) allowing a user to fill-in unpopulated metadata fields and to edit the automatically populated metadata fields;
    (f) recording the metadata values assigned to image file;
    (g) retrieving a next image file and using the values assigned to the previous image file to populate a portion of the metadata fields for the current image;
    (h) repeating steps (b)–(g) or each image file to be uploaded to the photosharing service; and
    (i) uploading the image files and corresponding metadata to the photosharing service.

11. The method of claim 10 wherein step (c) further includes the step of: allowing image type plug-ins to interface with the application through the plug-in interface to increase a number of image file types supported by the application.

12. The method of claim 10 further including the step of: allowing the user to edit the image depicted in image file from the application prior to uploading to the photosharing service.

13. The method of claim 12 further including the step of: providing rotation, color correction, and cropping as image editing functions.

14. The method of claim 10 wherein step (d) further includes the step of:
    (i) when displaying the downloaded metadata fields indicating to the user which ones of the metadata fields are automatically detected from the image file, and which ones of the metadata fields are to be manually entered by the user.

15. The method of claim 14 wherein step (d) further includes the step of: displaying different categories of metadata differently as a visual aid to the user.

16. The method of claim 10 wherein step (d) further includes the step of:
    (ii) indicating to the user which ones of the metadata fields are optional fields and which are required fields.

17. The method of claim 10 wherein step (f) further includes the step of:
    (i) recording the metadata values assigned to image file in a history repository.

18. The method of claim 17 wherein step (f) further includes the step of:
    (ii) providing the history repository as a plug-in.

19. The method of claim 10 wherein step (i) further includes the step of:
    (i) placing the images and metadata in a queue for uploading that is processed by the application in a background process.

20. A computer-readable medium containing program instructions for automatically discovering metadata for digital image files and for submitting the metadata and image files to a network-based photosharing service by an application running on a client computer, the program instructions for:

(a) downloading to the client computer from the photosharing service a list of metadata fields to be populated for the image files;

(b) selecting a first image file and parsing the image file to extract metadata values therein, and using the metadata values to populate a portion of the downloaded metadata fields;

(c) providing the application with a plug-in interface by which multiple image recognition applications may be added to the application, and using at least one of the image recognition applications to automatically analyze the image file, associate the image file with a particular category based on the analysis, and to populate at least one of the downloaded metadata fields with a value indicating the assigned category;

(d) displaying on the client computer a list of the downloaded metadata fields and the corresponding values that were automatically populated in instructions (b) and (c);

(e) allowing a user to fill-in unpopulated metadata fields and to edit the automatically populated metadata fields;

(f) recording the metadata values assigned to image file;

(g) retrieving a next image file and using the values assigned to the previous image file to populate a portion of the metadata fields for the current image;

(h) repeating instructions (b)–(g) or each image file to be uploaded to the photosharing service; and (i) uploading the image files and corresponding metadata to the photosharing service.

21. The computer-readable medium of claim 20 wherein instruction (c) further includes the instruction of: allowing image type plug-ins to interface with the application through the plug-in interface to increase a number of image file types supported by the application.

22. The computer-readable medium of claim 20 further including the instruction of: allowing the user to edit the image depicted in image file from the application prior to uploading to the photosharing service.

23. The computer-readable medium of claim 22 further including the instruction of: providing rotation, color correction, and cropping as image editing functions.

24. The computer-readable medium of claim 20 wherein instruction (d) further includes the instruction of:

(i) when displaying the downloaded metadata fields indicating to the user which ones of the metadata fields are automatically detected from the image file, and which ones of the metadata fields are to be manually entered by the user.

25. The computer-readable medium of claim 24 wherein instruction (d) further includes the instruction of: displaying different categories of metadata differently as a visual aid to the user.

26. The computer-readable medium of claim 20 wherein instruction (d) further includes the instruction of:

(iii) indicating to the user which ones of the metadata fields are optional fields and which are required fields.

27. The computer-readable medium of claim 20 wherein instruction (f) further includes the instruction of:

(i) recording the metadata values assigned to image file in a history repository.

28. The computer-readable medium of claim 27 wherein instruction (f) further includes the instruction of:

(ii) providing the history repository as a plug-in.

29. The computer-readable medium of claim 20 wherein instruction (i) further includes the instruction of:

(i) placing the images and metadata in a queue for uploading that is processed by the application in a background process.

* * * * *